(12) United States Patent
Conn et al.

(10) Patent No.: US 12,248,953 B2
(45) Date of Patent: Mar. 11, 2025

(54) SYSTEM AND METHOD FOR PREDICTIVE ANALYTICS

(71) Applicant: Productable, Inc., Austin, TX (US)

(72) Inventors: Rachel Kuhr Conn, Austin, TX (US); Janice Fraser, Austin, TX (US); Aboudi Minkara, Austin, TX (US); Christina White, Austin, TX (US); Wesley Galliher, Austin, TX (US); Jennifer Prishtina, Austin, TX (US); Nick Chagin, Austin, TX (US); Tyler Steinke, Austin, TX (US); Jeffrey Bryant, Austin, TX (US)

(73) Assignee: Productable, Inc., Austin, TX (US)

( * ) Notice: Subject to any disclaimer, the term of this patent is extended or adjusted under 35 U.S.C. 154(b) by 0 days.

(21) Appl. No.: 17/565,297

(22) Filed: Dec. 29, 2021

(65) Prior Publication Data
US 2022/0215410 A1    Jul. 7, 2022

Related U.S. Application Data

(60) Provisional application No. 63/131,648, filed on Dec. 29, 2020.

(51) Int. Cl.
*G06Q 10/00*     (2023.01)
*G06Q 10/04*     (2023.01)
*G06Q 30/0202*   (2023.01)

(52) U.S. Cl.
CPC ......... *G06Q 30/0202* (2013.01); *G06Q 10/04* (2013.01)

(58) Field of Classification Search
None
See application file for complete search history.

(56) References Cited

U.S. PATENT DOCUMENTS

| 9,367,810 B1* | 6/2016 | Gagne | G06F 11/0793 |
| 2002/0169658 A1* | 11/2002 | Adler | G06Q 10/06 705/7.29 |

(Continued)

OTHER PUBLICATIONS

DD Hwang (Performance measurement system design for supply chain organizations) 2011—dspace.mit.edu (Year: 2011).*
PCT Search Report and Written Opinion, Mar. 30, 2022.

*Primary Examiner* — Hafiz A Kassim
(74) *Attorney, Agent, or Firm* — Kirby Drake

(57) ABSTRACT

Systems and methods for predictive analytics may make innovation success easy to manage by predicting the best process and teams to help teams discover if their ideas can reach ideal outcomes. Leadership may make a portfolio of investments in opportunity areas. Each opportunity area's funds may be broken down into different bets. Each bet fund may have success criteria to determine if an opportunity can continue to the next stage of funding. Each success metric may have blocks that help take ideas to success. Systems and methods may recommend the best block path to success for each idea. Blocks may be recommended based on context including, but not limited to, progress, goals, priorities, team dynamics, and skills. These systems and methods also may empower people to drive success, while engaging interests, saving hours, and eliminating wrong work. Good decisions may be made to maximize ROI, thereby creating innovation success.

8 Claims, 22 Drawing Sheets

(56) References Cited

U.S. PATENT DOCUMENTS

| | | | |
|---|---|---|---|
| 2003/0058277 A1 | 3/2003 | Bowman-Amuah | |
| 2005/0114829 A1* | 5/2005 | Robin | G06Q 10/06 |
| | | | 717/101 |
| 2005/0171834 A1* | 8/2005 | Yokota | G06Q 10/00 |
| | | | 705/7.22 |
| 2005/0187844 A1* | 8/2005 | Chalermkraivuth | ........ |
| | | | G06Q 10/06375 |
| | | | 705/36 R |
| 2007/0156478 A1* | 7/2007 | Breene | G06Q 10/06375 |
| | | | 705/7.29 |
| 2008/0167930 A1 | 7/2008 | Cao et al. | |
| 2009/0064143 A1* | 3/2009 | Bhogal | G06F 9/542 |
| | | | 718/100 |
| 2009/0125346 A1* | 5/2009 | Loconzolo | G06Q 10/06 |
| | | | 705/7.27 |
| 2011/0125544 A1* | 5/2011 | Shtub | G06Q 10/067 |
| | | | 705/348 |
| 2012/0245896 A1* | 9/2012 | Bernardini | G06F 11/3612 |
| | | | 702/183 |
| 2013/0173355 A1* | 7/2013 | Barcenas | G06Q 10/06393 |
| | | | 705/7.39 |
| 2014/0222485 A1* | 8/2014 | Cantor | G06Q 10/0635 |
| | | | 705/7.22 |
| 2015/0112766 A1* | 4/2015 | Barney | G06Q 30/0203 |
| | | | 705/7.32 |
| 2015/0154526 A1* | 6/2015 | Yates | G06Q 10/06393 |
| | | | 705/7.39 |
| 2016/0132828 A1* | 5/2016 | Hartung | G06Q 10/103 |
| | | | 705/7.39 |
| 2017/0006135 A1* | 1/2017 | Siebel | G06Q 10/06 |
| 2020/0233662 A1 | 7/2020 | Bissonette et al. | |
| 2020/0285936 A1 | 9/2020 | Sen | |

\* cited by examiner

FIGURE 4E

SYSTEM AND METHOD FOR PREDICTIVE ANALYTICS

CROSS-REFERENCE TO RELATED APPLICATION

The present application is a non-provisional of, and claims priority to, U.S. Patent Application No. 63/131,648 filed on Dec. 29, 2020, which is incorporated by reference in its entirety.

FIELD OF THE DISCLOSURE

The present disclosure generally relates to innovation success and/or behavior change, and more particularly to systems and methods for predictive analytics for innovation success and/or behavior change.

BACKGROUND

82% of companies expect all innovation efforts to succeed, but only 5% of innovation actually succeeds. Innovation requires an investment portfolio of bets, as it is often misunderstood to have the stability of day-to-day operations, and each bet needs the right nurture for a chance to succeed. However, this ability to provide the right nurturing has not been readily available.

SUMMARY

Embodiments of the present disclosure may provide systems and methods for predictive analytics that may make innovation success easy to manage. These systems and methods may predict the best process and/or teams to help teams and/or leadership investing in the ideas discover if their ideas can reach ideal and/or clearly defined outcomes.

Leadership may make a portfolio of investments in opportunity areas. Each opportunity area's funds may be broken down into a range of bets having various sizes. Each bet fund may have success criteria to determine if an opportunity can continue. Blocks are focused or aligned, repeatable chunks of work that could include streamlined experiences and/or automated reporting. Each success metric may have blocks that help take ideas to success. However, it should be appreciated that the association between success metrics and blocks can work in both directions. A success metric may have a score associated with different characteristics and so may a block as a recommended engine style.

Systems and methods according to embodiments of the present disclosure may recommend an optimized and/or personalized block path to success for each idea. Blocks may be recommended based on context including, but not limited to, progress, goals, team dynamics, and skills. These systems and methods may make it simple to engage people and companies outside the walls of the business. These systems and methods also may empower people to drive success in achieving innovation outcomes, while engaging interests, saving hours, and eliminating wrong work. The systems and methods also may generate opportunities for continuous improvement and/or optimization of the model for performance based on various factors including, but not limited to, cost reduction, effort, and/or resource management, so that decisions may be made to maximum return of investment (ROI), thereby creating innovation success across the business.

Other embodiments of the present disclosure may provide a method for predictive analytics comprising: forecasting one or more opportunity area goals and resources for a portfolio; recommending at least one block of work; as the at least one block of work is performed, reviewing progress metrics associated with the at least one block of work; and based on the review of the progress metrics, updating the forecast of the one or more opportunity areas goals and resources to improve the forecasting. The forecasting step may further comprise for a pipeline, forecasting one or more decisions and supporting blocks; and for a group, forecasting at least one team for a project associated with the at least one block of work. Completion of the at least one block of work may progress model maturity of the portfolio, model maturity of the pipeline, a personal innovation mindset for a person completing the project, and/or the project. Progress metrics may comprise person, project, pipeline, and portfolio data. The updating step may further comprise updating project progress and challenges; and updating pipeline progress and challenges. The updating step may occur automatically or asynchronously.

Further embodiments of the present disclosure may provide a method for predictive analytics comprising: identifying one or more opportunity area goals and resources; recommending and assigning one or more blocks of work, wherein progress metrics are associated with each of the one or more blocks of work; running the one or more blocks of work; upon completion of the one or more blocks of work, evaluating performance of the one or more blocks of work; reconciling the performance of the one or more blocks of work with the one or more opportunity area goals and resources; and re-running the one or more blocks of work. The blocks of work may be selected from the group comprising: return on investment (ROI) calculation, user interviews, prototype creation, user testing, market sizing, extreme ideation, experiment design, pricing strategy, persona creation, communication and/or prioritization. The progress metrics may be selected from the group comprising: required skills, types of progress it drives, speed of deployment, productivity rate, maintenance error rate, psychometrics, sociometrics, phases of innovation, and type of effort. Each of the one or more blocks may further comprise: expert review questions that check the quality of work completed, funder review questions that check the progress of the idea, and/or individual review that is a hybrid of the expert review questions and the funder review questions. The recommending and assigning step may use a questionnaire that understands current progress of a user to recommend one or more blocks of work. The reconciling step may further comprise forecasting and improving relative to the one or more opportunity area goals and resources. Evaluating performance may comprise at least one of the following: comparing expected to actual outcomes, evaluating pipeline success rate, evaluating portfolio trends, reviewing progress, reviewing progress effectiveness, and reviewing block effectiveness and feedback. Each of the one or more blocks of work may include at least one activity that is assigned to one or more team members for completion. Resources may be time and/or monetary.

Another embodiment of the present disclosure may provide a method of predictive analytics comprising: forecasting one or more opportunity area goals and resources for a portfolio; forecasting decisions and supporting blocks for a pipeline; recommending at least one block of work; as the at least one block of work is performed, reviewing progress metrics associated with the at least one block of work; based on the review of the progress metrics, updating the forecast of the one or more opportunity areas goals and resources to progress model maturity of the portfolio; and based on the review of the progress metrics, updating the forecast of the one or more decisions and supporting blocks to progress model maturity of the pipeline.

BRIEF DESCRIPTION OF THE DRAWINGS

For a more complete understanding of this disclosure, reference is now made to the following description, taken in conjunction with the accompanying drawings, in which:

FIGS. 4A-4E depict a workflow for a predictive analytics system according to an embodiment of the present disclosure;

DETAILED DESCRIPTION

Figure 1:
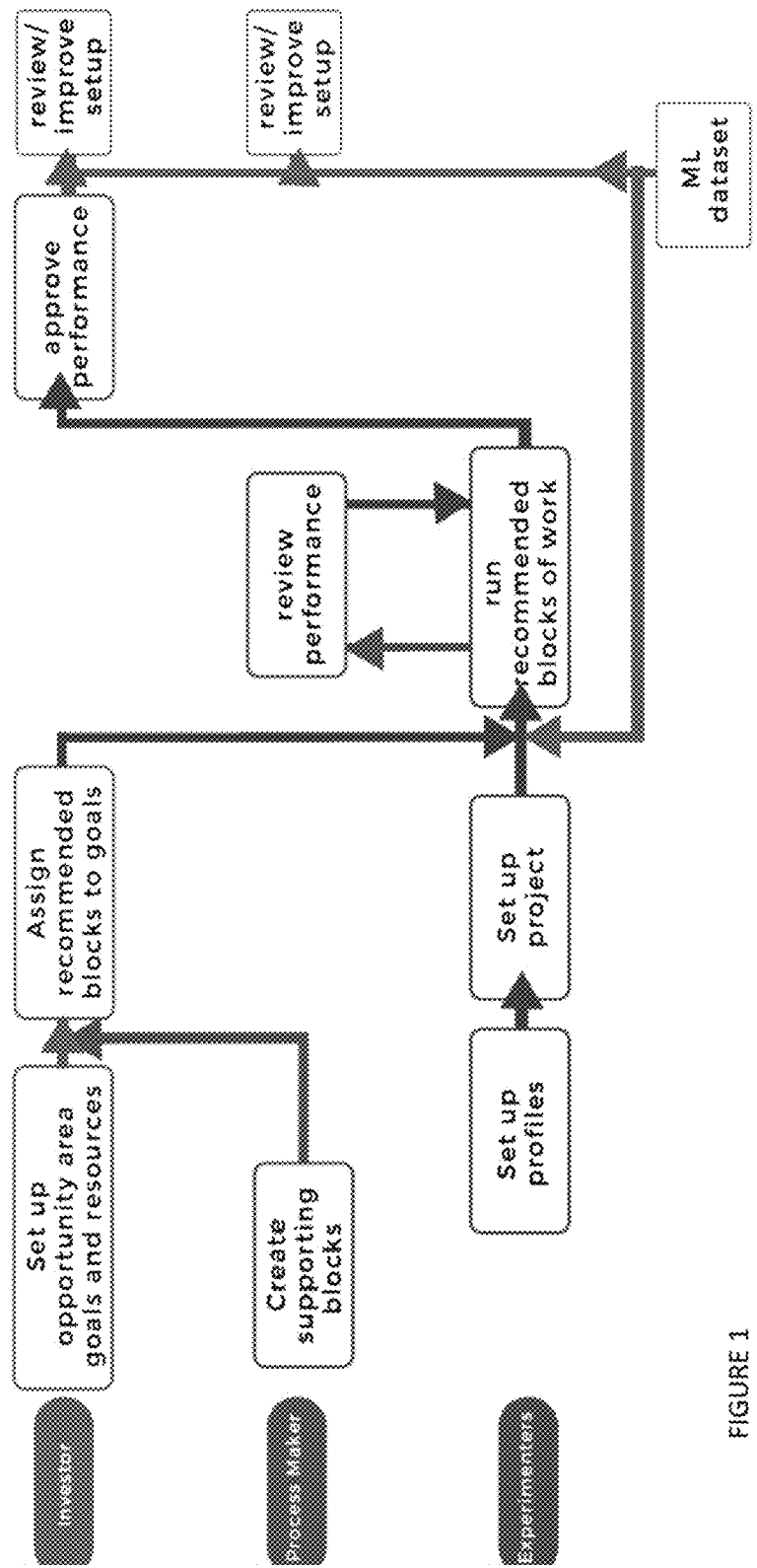
FIG. 1 depicts a method for predictive analytics according to an embodiment of the present disclosure.

Leaders set up opportunity areas with goals and allocated funding. Each goal is progress to a type of growth metric including, but not limited to, revenue, cost cut, number of viewers, and/or other quantitative measurements.

Expert process leaders set up one or more blocks of work which may include, but are not limited to, ROI calculation, user interviews, prototype creation, user testing, market sizing, extreme ideation, experiment design, pricing strategy, persona creation, communication (i.e., pitching concepts, detailing barriers, requesting support), and/or prioritization. Blocks of works have progress metrics including, but not limited to, required skills, types of progress it drives, and innovation science metrics including, but not limited to, psychometrics, sociometrics, phases of innovation, and type of effort. Progress metrics may be tied back to growth metrics. Each block may include a feedback loop with expert review questions that check the quality of work completed, funder review questions that check the progress of the idea, and/or individual review that is a hybrid of the expert review questions and the funder review questions. The individual review can run as a self-check throughout the process that can be shared with others when help or support is needed. It should be appreciated that one or more of these blocks of work may be set up without goals and allocated funding being designated in embodiments of the present disclosure.

A first opportunity area recommendation engine may be set. Based on progress metrics and goal metrics, a hierarchical list, logical workflow, a recommendation engine, or other similar organization of recommended blocks may be associated with each outcome via a small set of matching metrics. An outcomes-aligned evaluation tool, such as a questionnaire, may be set up that understands the current progress of an experimenter so a first block can be recommended. This may be one evaluation tool or could be more than one type of evaluation tool in embodiments of the present disclosure. It should be appreciated that this setting of a first opportunity area recommendation engine may be set without goals and allocated funding being designated in embodiments of the present disclosure.

Each experimenter may have a profile with associated skills, interests, psychometrics and sociometrics. An experimenter with an idea completes the evaluation and is recommended a block of work or a series of blocks of work that may be done in any order in an embodiment of the present disclosure. Systems and methods according to embodiments of the present disclosure may recommend team members that have aligned values to the block to create the most capable team. The user can use the recommendations or create their own team. Each activity within a block is recommended to the ideal team member, which they can choose to accept or choose differently.

The experimenters do a block of work. They do the self-review. A next block may then be recommended, or the experimenters can do an expert or funder review to see how they did. This may get them a new block or access to the next phase of an opportunity area with a different set of blocks and logic. In completing the blocks of work, the experimenters may ask for support and/or feedback to iterate and improve on the block before moving forward in embodiments of the present disclosure.

Each review question may be associated with different progress block metrics and growth metrics. Additionally, systems and methods according to embodiments of the present disclosure may recommend future phases of or different opportunity areas for different projects based on their progress.

FIG. 1 depicts a method for predictive analytics according to an embodiment of the present disclosure. An investor may set up an opportunity area goals and resources. A process maker may create supporting blocks and outcomes-based decision criteria. Using the opportunity area goals and resources as well as the supporting blocks, the investor may assign recommended blocks to goals. Experimenters may set up profiles and set up projects. The experimenters may then take the recommended blocks assigned to goals and run recommended blocks of work. After the blocks of work are run, which may include feedback loop(s) and iterations, a performance review may be conducted, and the performance may then be approved. In embodiments of the present disclosure, a review or improvement of the setup may be conducted, and the recommended blocks of work may be run again as set forth in FIG. 1.

Figure 2:
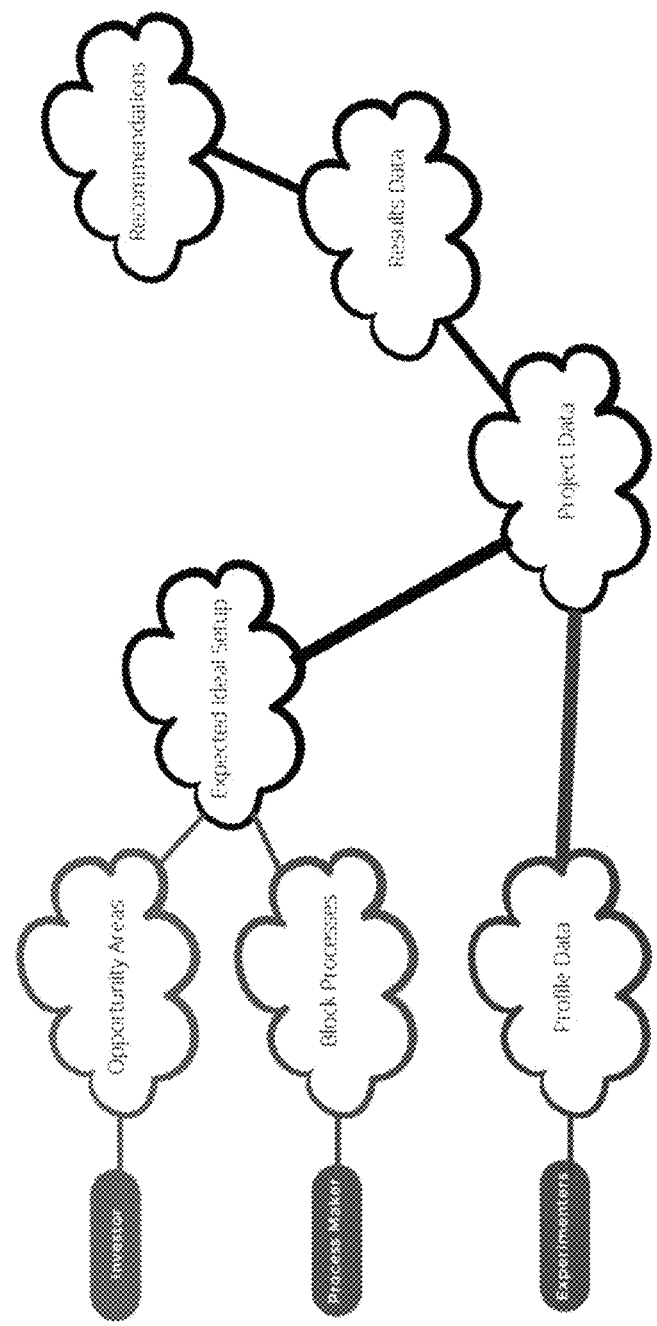
FIG. 2 depicts types of data associated with the system and method for predictive analytics according to an embodiment of the present disclosure.

FIG. 2 depicts types of data associated with the system and method for predictive analytics according to an embodiment of the present disclosure. As discussed with respect to FIG. 1, different types of data may be associated with investors, process makers, and experimenters. Investors may provide opportunity areas while the process makers provide block processes, and the opportunity areas and block processes combine to provide an expected ideal setup. The experimenters may be associated with profile data which may combine with the expected ideal setup to provide project data which may then provide results data and recommendations as depicted in FIG. 2.

Figure 3A:
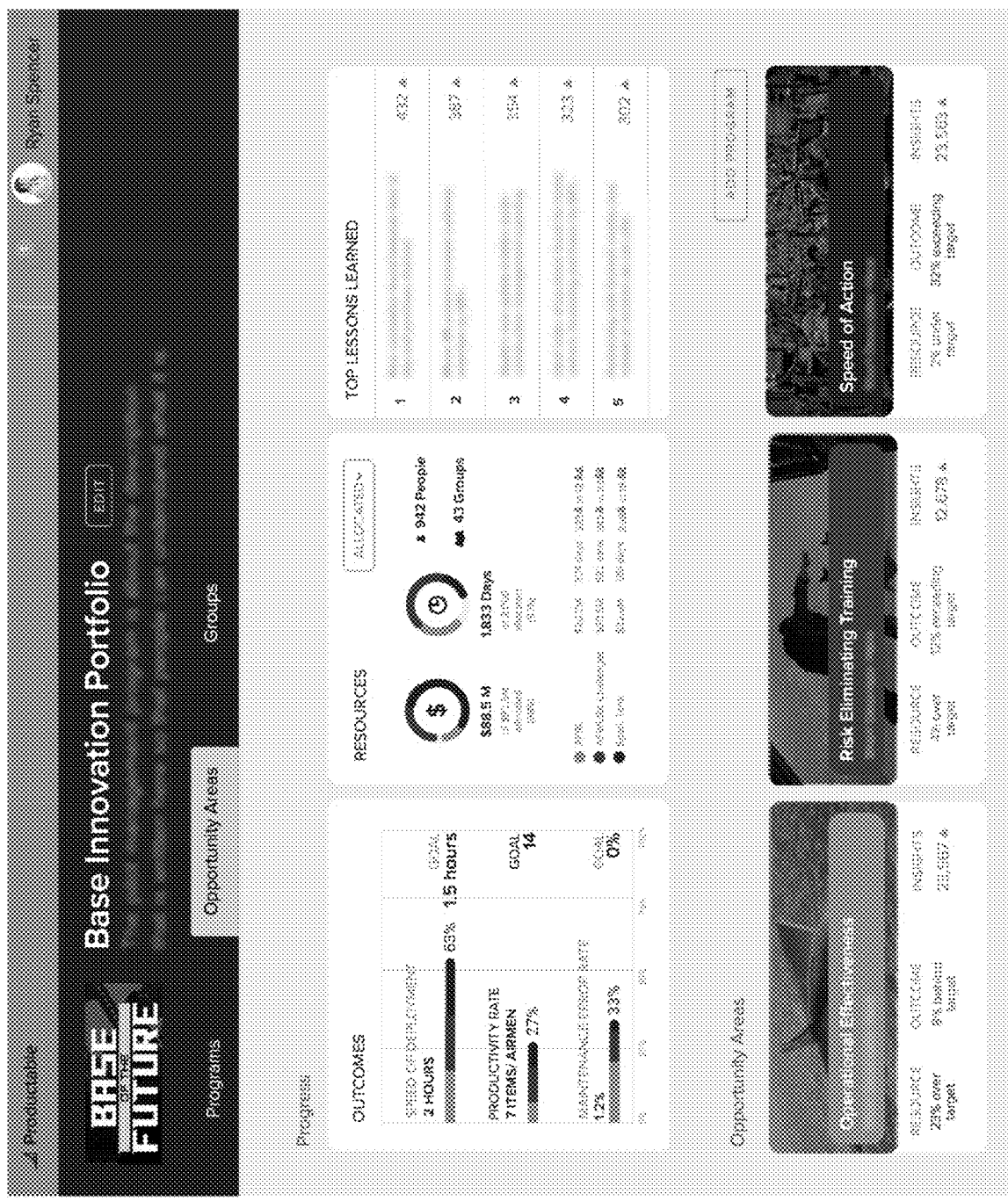
FIGS. 3A-3F depict screenshots of a system and method for predictive analytics according to an embodiment of the present disclosure.

FIGS. 3A-3F depict screenshots of a system and method for predictive analytics according to an embodiment of the present disclosure. FIG. 3A depicts an opportunity areas dashboard according to an embodiment of the present disclosure. A user may be provided with various progress metrics. Progress may include outcomes including, but not limited to, speed of deployment, productivity rate, and maintenance error rate. These outcomes may be compared to goals as set forth in FIG. 3A. It should be appreciated that these outcomes may be tailored to the project in embodiments of the present disclosure. Progress also may include resources which may be monetary and/or time resources. The resources may be broken down by project or opportunity area in embodiments of the present disclosure. Progress also may include top lessons learned as depicted in FIG. 3A. Each of the opportunity areas associated with a portfolio may be depicted on this dashboard and may include a summary of the resource usage, outcome (i.e., behind or exceeding target), and/or insights in embodiments of the present disclosure. While three opportunity areas are depicted on FIG. 3A, it should be appreciated that more or fewer may be depicted without departing from the present disclosure.

Figure 3B:
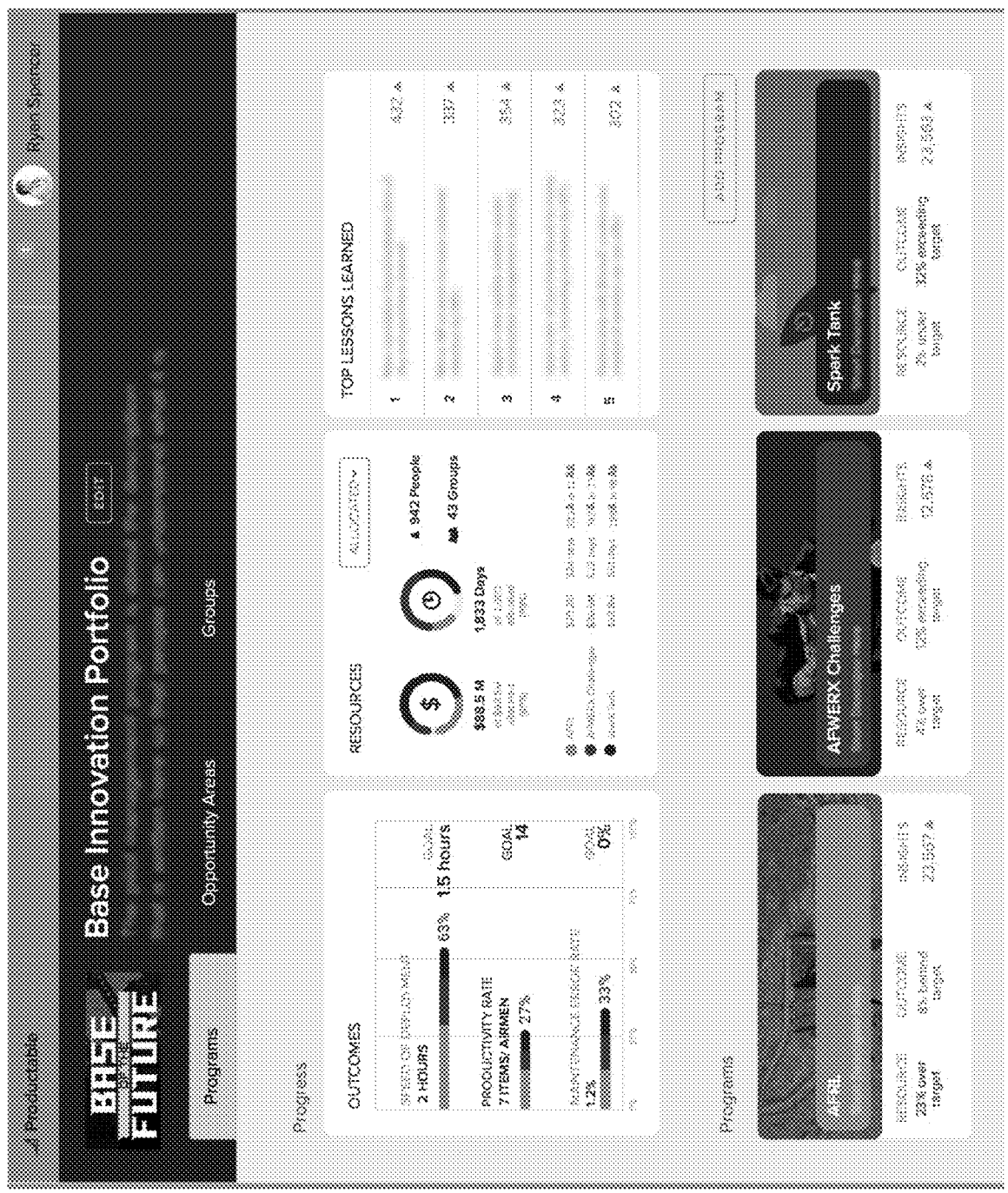

FIG. 3B depicts a program dashboard according to an embodiment of the present disclosure. This program dashboard may be configured similar to what was discussed with respect to the opportunity areas dashboard in FIG. 3A; however, instead of listing each opportunity area and the summary of the resource usage, outcome, and/or insights, the programs may be listed. While three programs are listed on this dashboard, it should be appreciated that more or fewer programs may be listed without departing from the present disclosure.

Figure 3C:

FIG. 3C depicts a dashboard for a specific program according to an embodiment of the present disclosure. The dashboard may include a plurality of tabs from which to select including pipeline, processes, and projects; however, the dashboard is depicting the pipeline tab in FIG. 3C. As depicted herein, the pipeline may be viewable for all phases or the pipeline may be viewable for a specific phase (i.e., ideate, develop, deploy, standardize) in embodiments of the present disclosure. FIG. 3C depicts the pipeline viewable for all phases. The pipeline may be viewable for active, complete, and/or remaining in embodiments of the present disclosure. FIG. 3C depicts the active pipeline broken down by phase and identifying whether the pipeline indicates being ahead or behind outcome goals. The dashboard also may summarize the total number of active, complete, and remaining projects as well as the success rate (and whether it is ahead or behind what had been predicted) and accuracy percentage. Various pipeline statistics also may be displayed including, but not limited to, average cost per project, average cost per win, and/or average length of the project. Each statistic may include an indication of whether it is ahead or behind what had been predicted. It should be appreciated that this dashboard may allow a user to build a formula for innovation as the user may know a hypothetical formula of time and money that may be required to achieve an outcome and compare it to the actual time and money required. A user may then keep iterating his/her investment thesis to get the performance desired. It should be appreciated that the system may enable predictions of time/money based on performance and/or the risk profile of the effort in some embodiments of the present disclosure. A summary of decisions to be made may be displayed on the dashboard, and it should be appreciated that the decisions may be ordered based on the most recent decision in embodiments of the present disclosure. The dashboard also may display a summary of self-review, expert review, and/or phase review and may be ordered based on most progress in embodiments of the present disclosure.

Figure 3D:
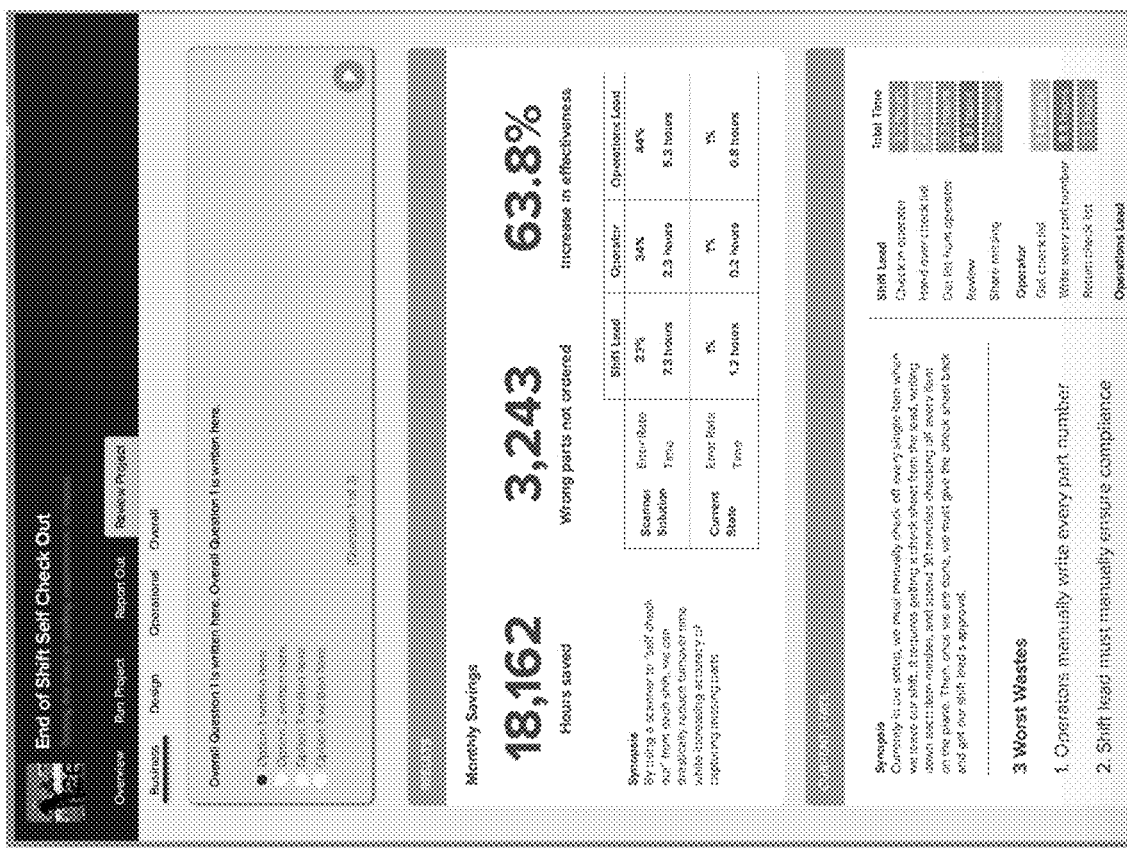

FIG. 3D depicts a portion of an end-of-shift checkout questionnaire according to an embodiment of the present disclosure. As depicted herein, a project may be reviewed based on an automated report-out so that a user may evaluate and give it a score based on the review questions. The user may be prompted to answer one or more questions that may be presented in multiple choice form, or the user may have to type in a response. The checkout also may include a summary of results for the project which may include, but may not be limited to, a synopsis of the project, error rate, time, hours saved, wrong parts not ordered, and/or increase in effectiveness. It should be appreciated that the results may be tailored to the project and may be broken down by monthly savings or over another period of time in embodiments of the present disclosure. FIG. 3D also depicts another block report-out example providing the current state of the project which may include, but is not limited to, a synopsis, the worst wastes, and the total time spent on different tasks by team members. It should be appreciated that blocks may include custom questions and can have outputs including, but not limited to, images, text, charts, maps, processes, and diagrams in embodiments of the present disclosure. Again, the items included in the current state may differ depending on the project. Once the questionnaire has been completed, an overall score may be provided, and a minimum passage score may be defined in embodiments of the present disclosure.

Figure 3E:

FIG. 3E depicts a dashboard or view of all blocks associated in a phase and may provide for selecting a block or workshop for one or more phases of a project according to an embodiment of the present disclosure. It should be appreciated that a user may view workshops for all phases or may specify a phase. FIG. 3E depicts workshops that may be available for the discover phase, and these workshops may include, but are not limited to, futurecasting, rapid prototype, prioritization, kickbox discover, experiment design, and/or extreme ideation. Using the project tab depicted on FIG. 3E, a user may view the different projects and a visual depiction of the status of each project for all phases or for a specific project.

Figure 3F:
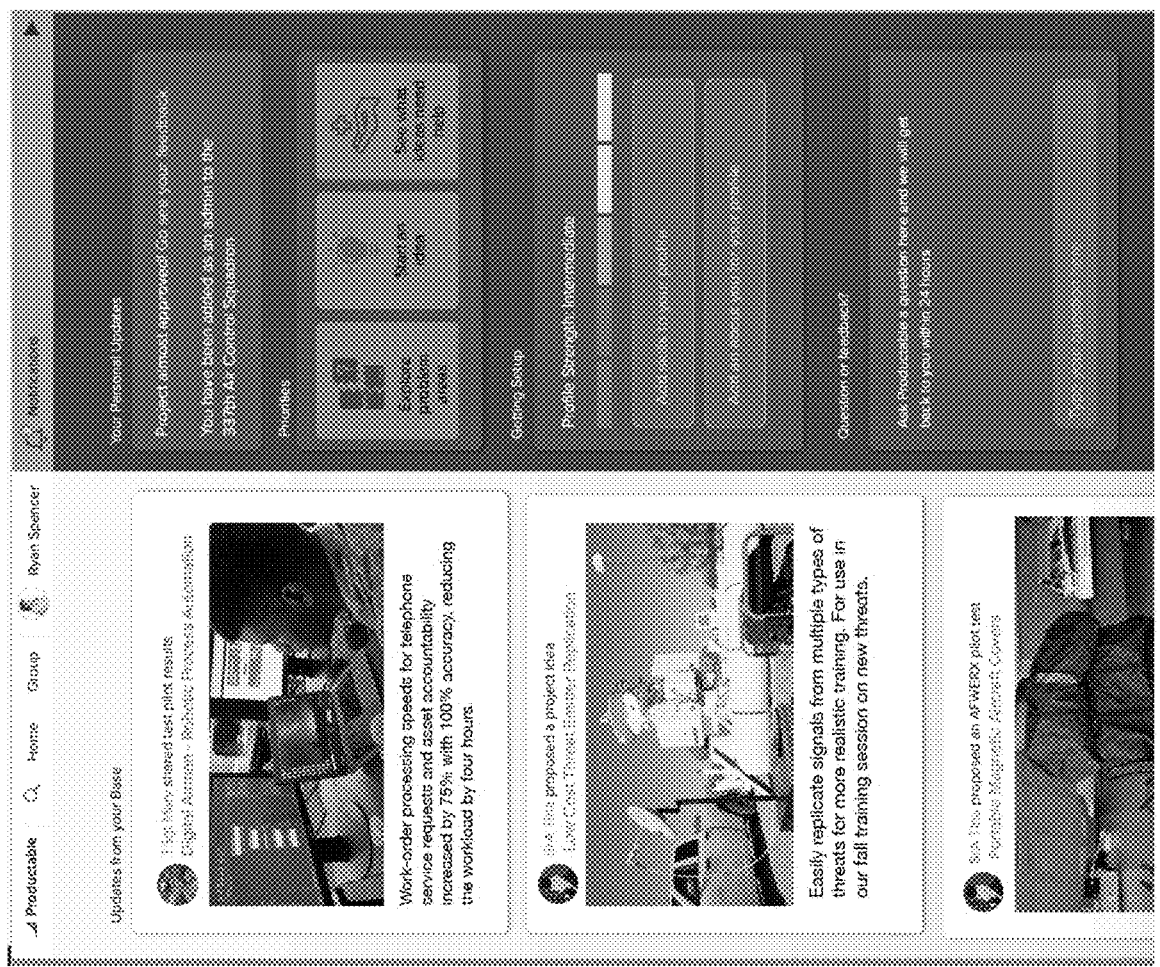

FIG. 3F depicts an update page according to an embodiment of the present disclosure. It should be appreciated that a user may be provided with updates from other team members wherein the updates may include, but are not limited to, sharing test results, proposing project ideas, and/or proposing project tests. The user may be viewing a block report out which provides updates of block completion in embodiments of the present disclosure. The user also may be provided with notifications which may include, but are not limited to, personal updates (i.e., whether a project has been approved, being added as an admin), priorities, profile setup (i.e., profile strength, adding skills to the profile, adding an about you to the profile), and/or questions or feedback.

Figure 4B:
Figure 4A:
Figure 4D:
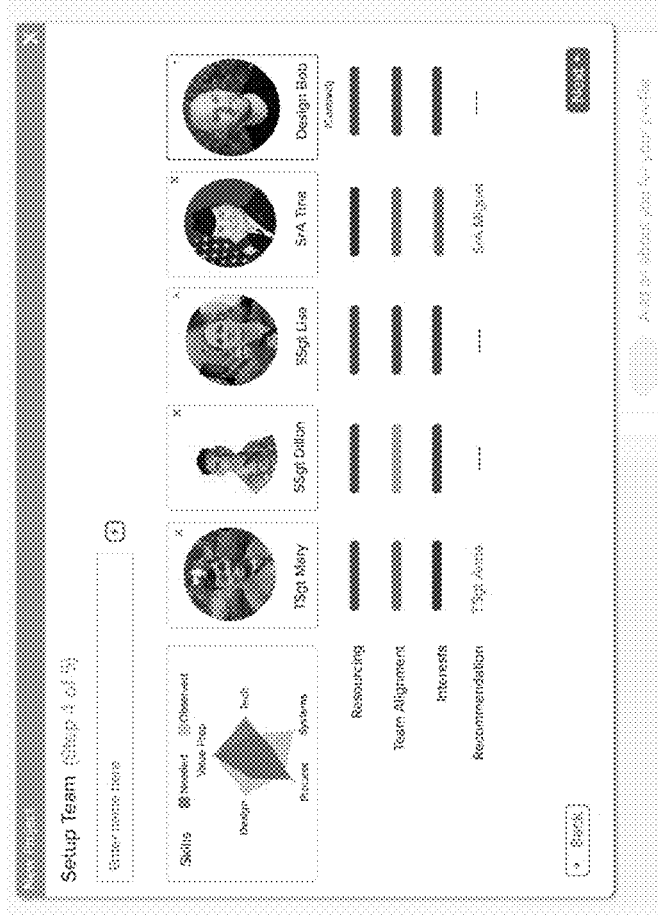
Figure 4C:
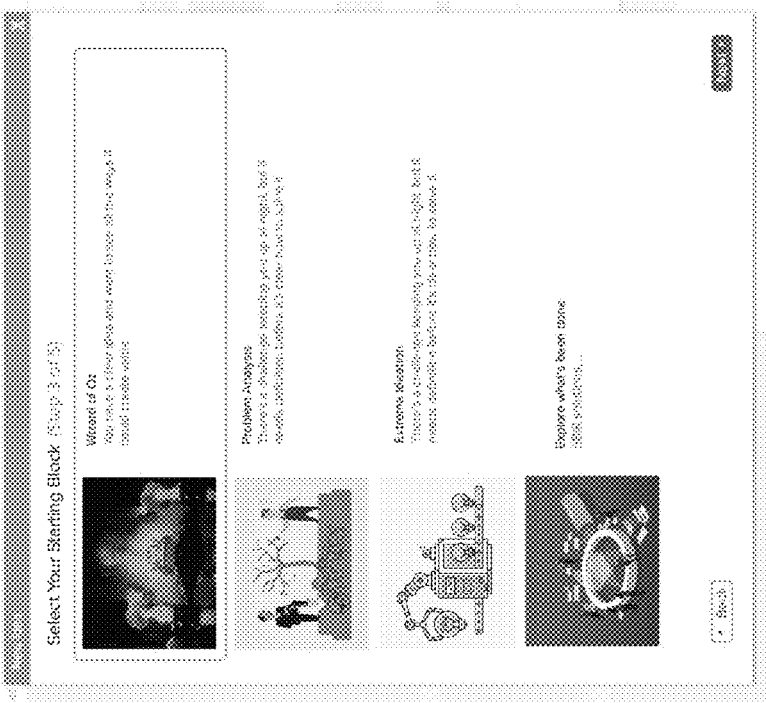
Figure 4E:
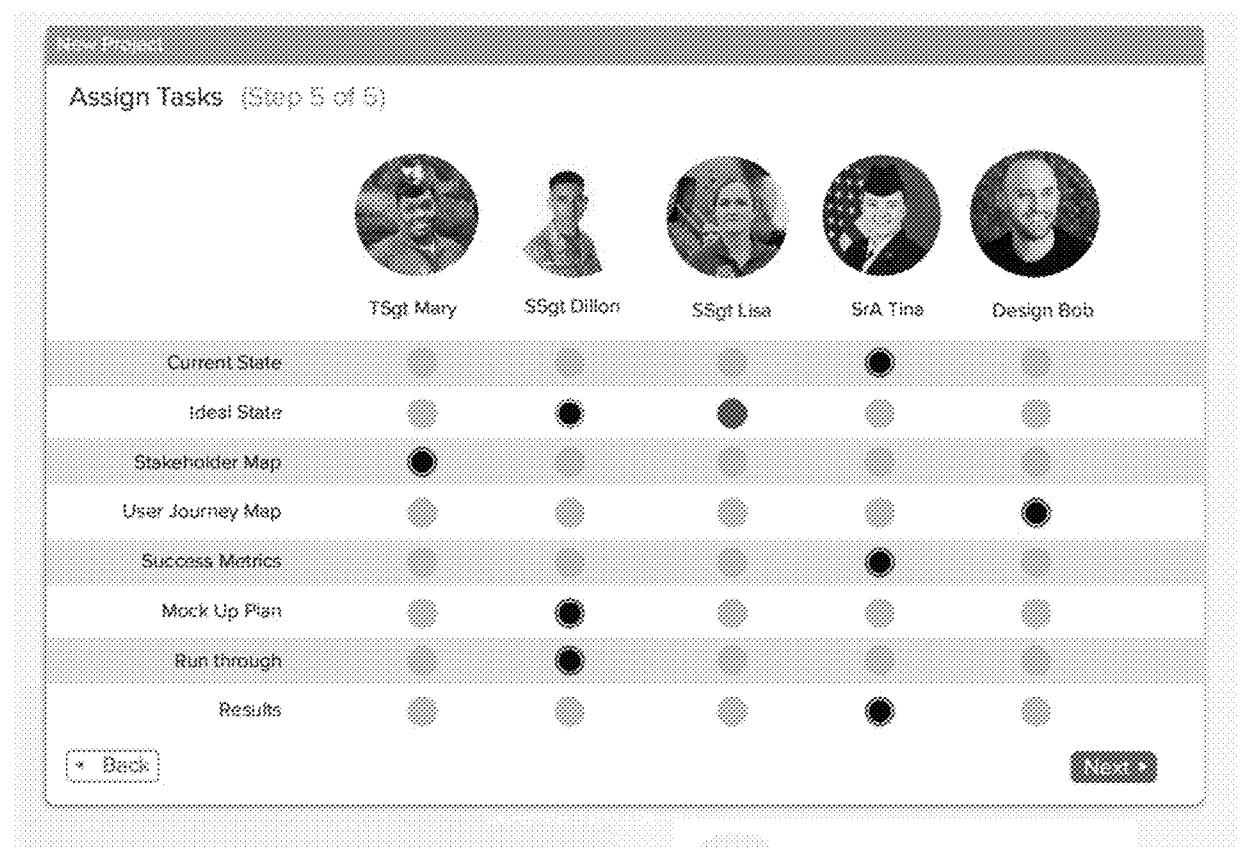

FIGS. 4A-4E depict a workflow for a predictive analytics system according to an embodiment of the present disclosure. FIG. 4A depicts a first step in adding details of a project. As depicted herein, a user may be prompted to insert several items of information including, but not limited to, project name, opportunity area, project description, project tags, and one or more images, which may include but are not limited to, photos, video, sketches, and/or CAD files. The opportunity areas may be pre-filled for selection from a dropdown box in an embodiment of the present disclosure. FIG. 4B depicts a second step in the workflow where a user may be prompted to provide more details about the idea. While this is referred to as a second step in the workflow, it should be appreciated that these are examples of steps that may be performed and may be configured in other manners or orders without departing from the present disclosure. The user may be prompted to identify how far along with the idea he/she is, and this may be on a sliding scale from an idea in my head up to ready for scaling according to an embodiment of the present disclosure. The user may then identify whether others are helping him/her (i.e., what the team looks like). The user also may be prompted to identify whether the idea fits into an opportunity area, how the idea may create value, and whether he/she knows if other people are doing similar ideas. Again, these prompts may be responded to through a sliding scale according to an embodiment of the present disclosure. In a third step (FIG. 4C), the user may be prompted to select a starting block. While this is referred to as a third step in the workflow, it should be appreciated that these are examples of steps that may be performed and may be configured in other manners or orders without departing from the present disclosure. FIG. 4C depicts four starting blocks: Wizard of Oz (where the user has a clear idea and wants to see all the ways it could create value); Problem Analysis (where there is a challenge keeping the user up at night but it needs definition before it is clear how to solve it); Extreme Ideation (where there is a challenge keeping the user up at night but it needs definition before it is clear how to solve it); and Explore What's Been Done. However, there can be more or fewer starting blocks provided without departing from the present disclosure. In a fourth step (FIG. 4D), the user may be prompted to set up his/her team for the project. The user may enter one or more names of potential team members, or the names of potential team members may be presented to the user based on the skills desired for the project. These names may be associated with profiles already available within the system. Accordingly, each potential team member may be ranked or valued with respect to the skills or other items of importance with respect to the project including, but not limited to, resourcing, team alignment, and interests. The user also may be provided with information as to whether other system users have recommended the potential team member. If potential team members are presented that the user does not wish to include on the team, the user may delete them from the team. Finally, tasks may be assigned to the team members as depicted in FIG. 4E. It should be appreciated that a team member may be assigned to more than one task and/or more than one team member may be assigned to the same task in embodiments of the present disclosure.

Figure 5B:
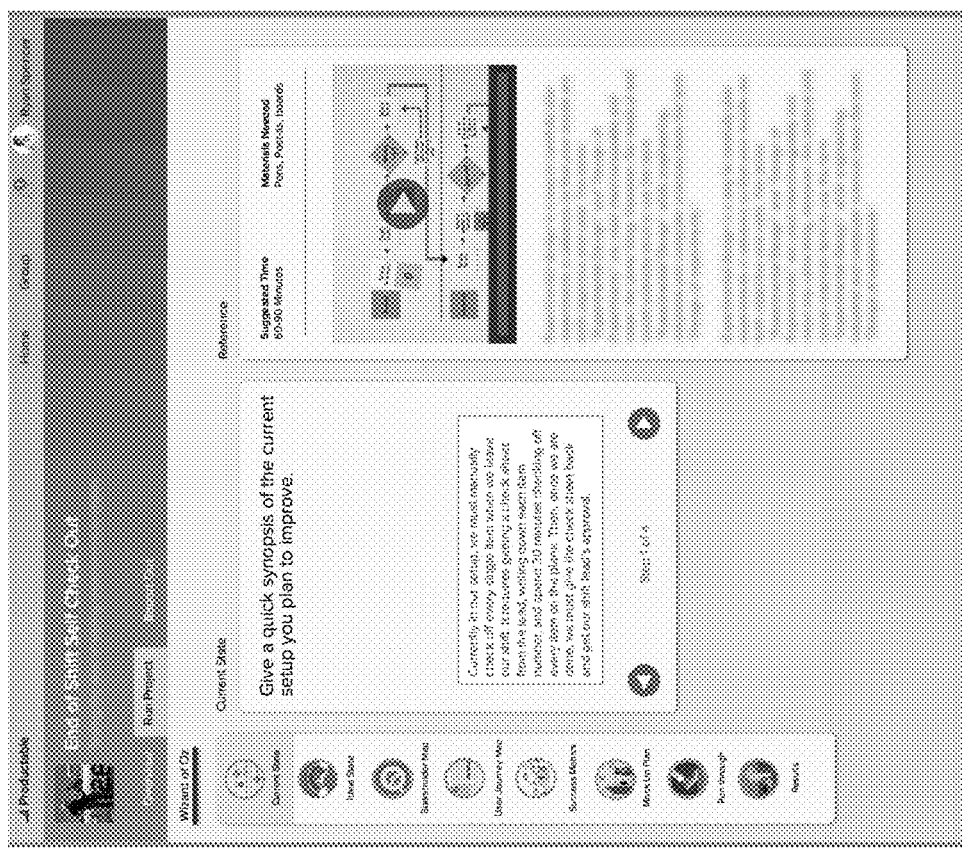
FIGS. 5A-5J depict screenshots of an end-of-shift checkout moving through a block of work having a series of questions and automated report-out according to an embodiment of the present disclosure.
Figure 5A:
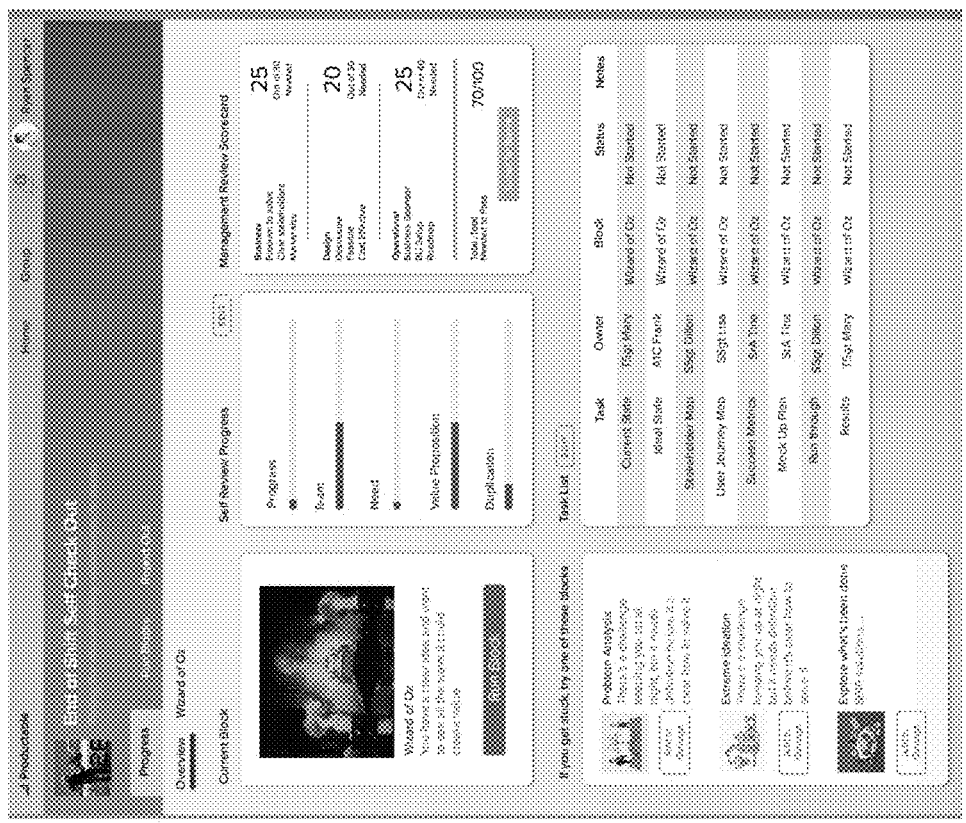
Figure 5D:
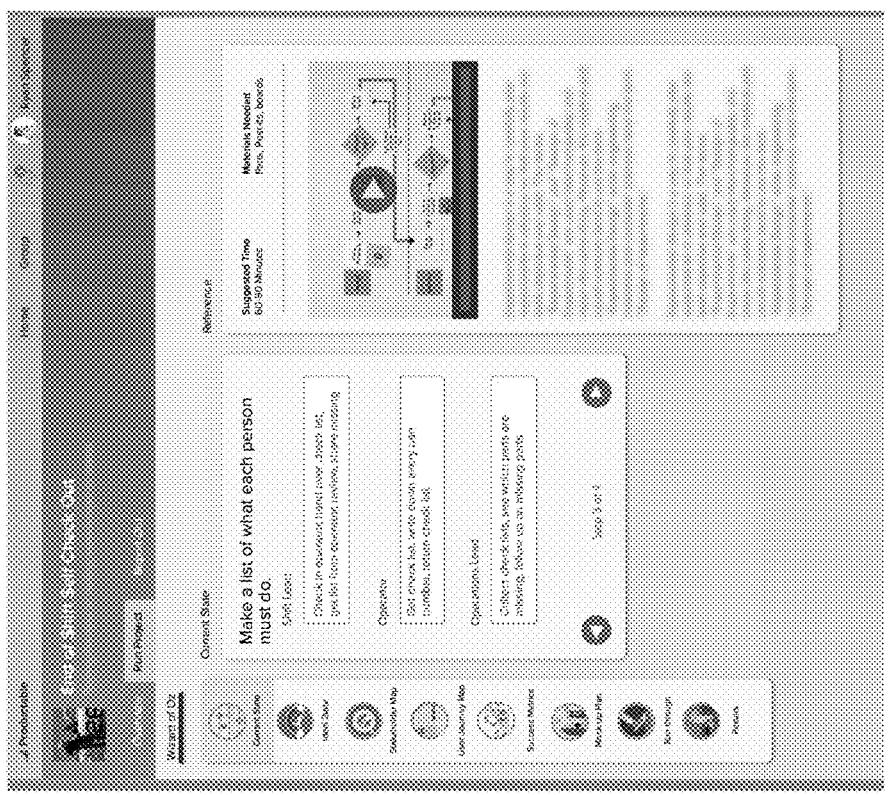

FIGS. 5A-5J depict screenshots of an end-of-shift checkout moving through a block of work having a series of questions and automated report-out according to an embodiment of the present disclosure. FIG. 5A depicts a progress overview and may include various items including, but not limited to, identification of current block (with the ability to run the block), self-review progress, management review scorecard, and/or task list and status. The user also may be provided with options for additional blocks to try if he/she gets stuck. While various items are identified in FIG. 5A and in other figures described or depicted herein, it should be appreciated that more or fewer items may be included without departing from the present disclosure.

Figure 5C:
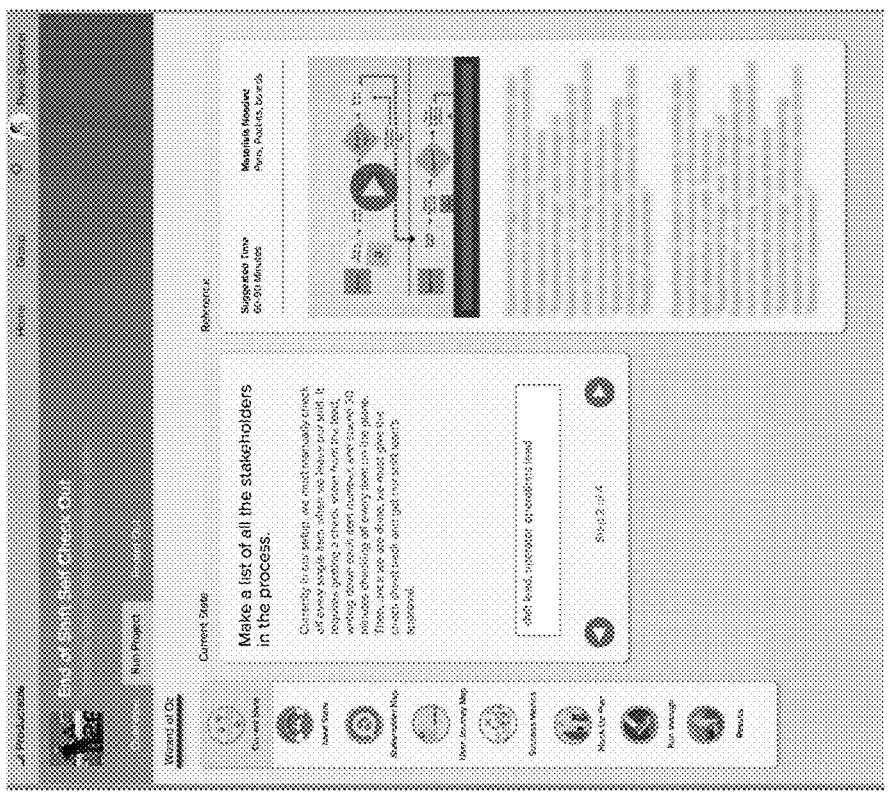
Figure 5F:
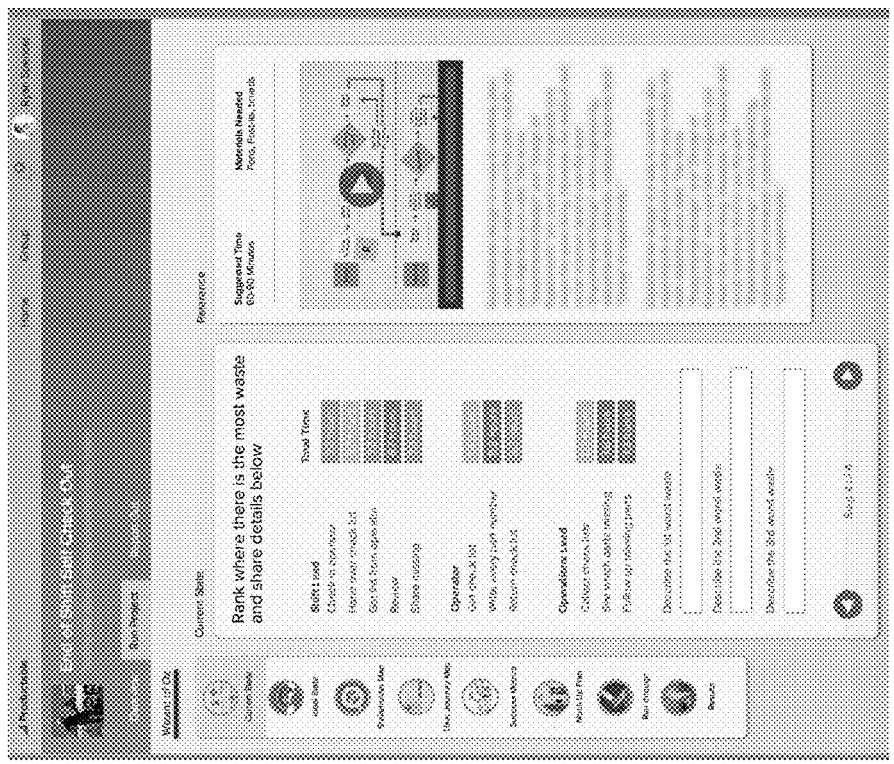
Figure 5E:
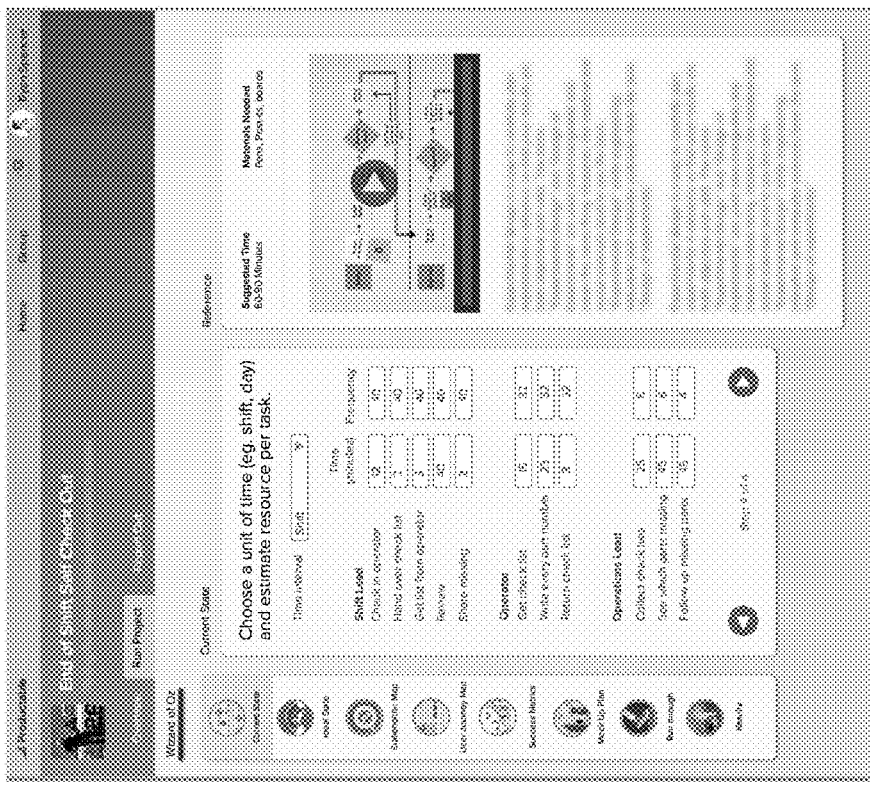

FIG. 5B depicts a screenshot of what a user may see if he/she elects to run the project through the current block. The user may be prompted to provide a quick synopsis of the current setup of the current state that the user plans to improve; however, it should be appreciated that this may not be required in embodiments of the present disclosure. A reference also may be provided indicating the suggested time and/or materials needed for completing the block. FIG. 5C depicts a second step of running the project. Again, a reference for running the block may be provided, and the user may be prompted to make a list of the stakeholders involved in the process in this embodiment of the present disclosure. In a third step (FIG. 5D), the user may be prompted to make a list of what each person/team member must do, and in the fourth step (FIG. 5E), the user may be prompted to choose a unit of time (e.g., shift, day) and estimate resources (i.e., time, frequency) per task assigned to each person/team member. The user also may be prompted to rank where there is the most waste and provide details about the wastes (FIG. 5F).

Figure 5H:
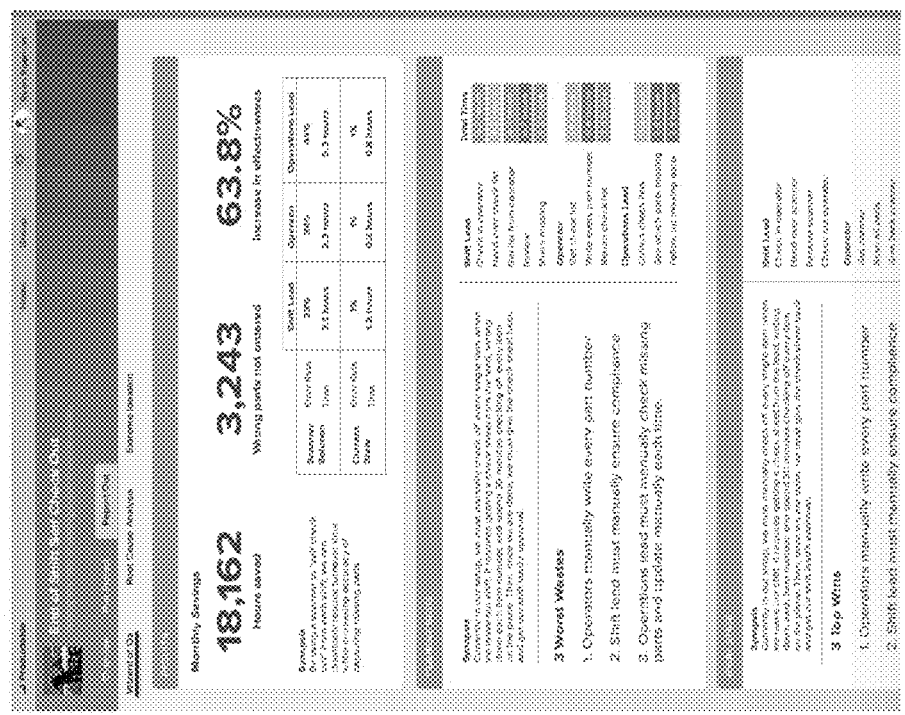
Figure 5G:

Upon entering the information prompted, the user may be provided with a synopsis of the current state, an identification of the wastes, and the time taken with respect to each task, and the user may be provided with a self-check to complete to assess whether the problems were captured in the current state and whether the problems identified were relevant to the concept (FIG. 5G). The user may then be provided with a summary of the analysis and/or results for the block which may include a synopsis of the project, the monthly savings involved (or other results relevant to the block), a synopsis of the current state, an identification of the worst wastes, and a synopsis of the ideal state, the top wins, and the tasks associated with each team member (FIG. 5H). Again, it should be appreciated that the results may vary depending on the type of project involved and the goals associated with the project.

Figure 5J:
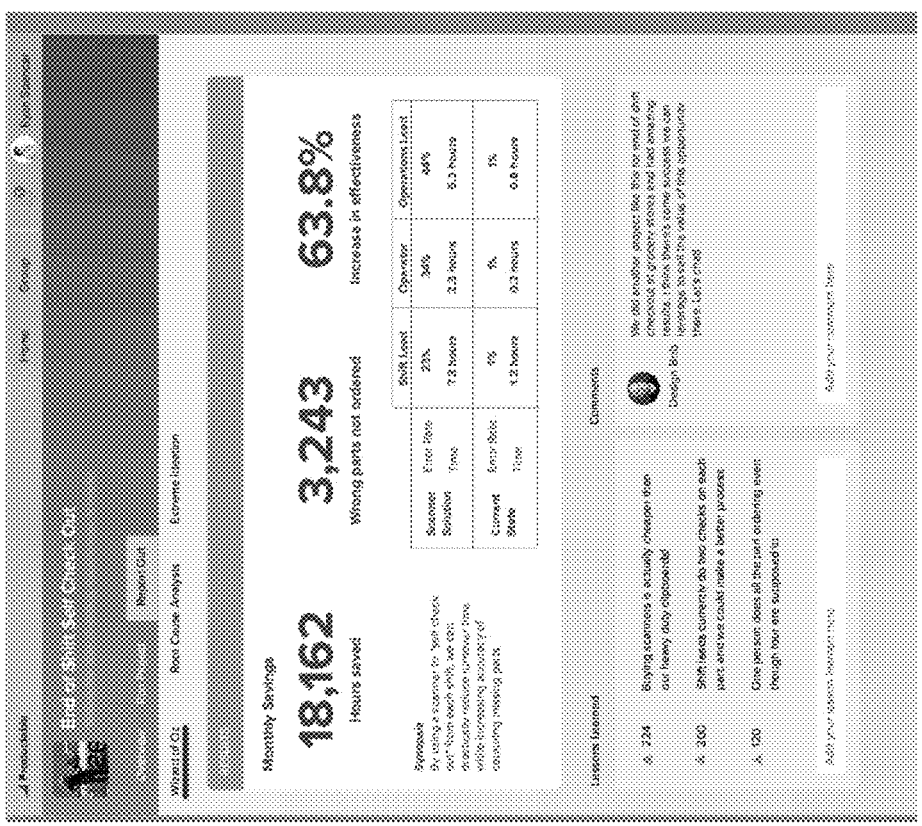
Figure 5I:
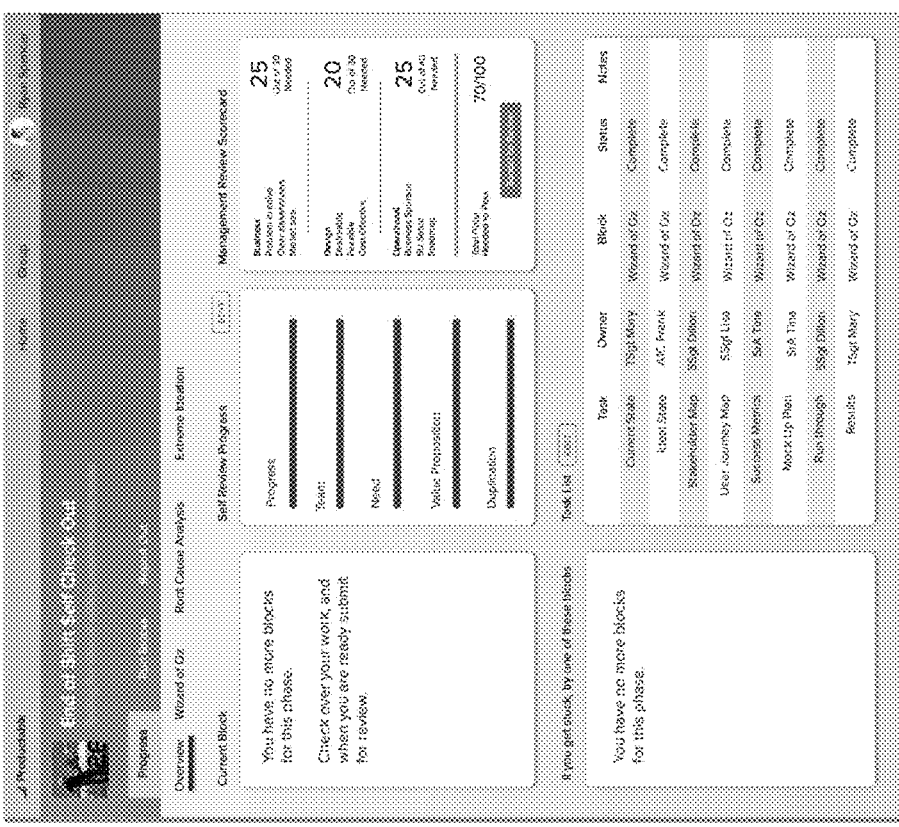

When a user completes all of the blocks for a phase, he/she may see a dashboard such as depicted in FIG. 5I. As depicted herein, the user may have completed all of the items in his/her self-review progress. The user also may have completed the benchmarks to achieve a passing score in the management review scorecard, and the user may submit his/her scores for review. The task list also may be updated to show that the tasks have been completed. The user also may be provided with a summary of analysis and/or results, lessons learned, and/or comments about the project (along with the ability to enter his/her own comments) (FIG. 5J). It also should be appreciated that the user may be permitted to add comments and/or lessons learned in connection with each block in embodiments of the present disclosure. It also should be appreciated that lessons learned may be scored so that the highest scoring lessons may appear at the top level, such as depicted in a portfolio view, in embodiments of the present disclosure.

Figure 6:
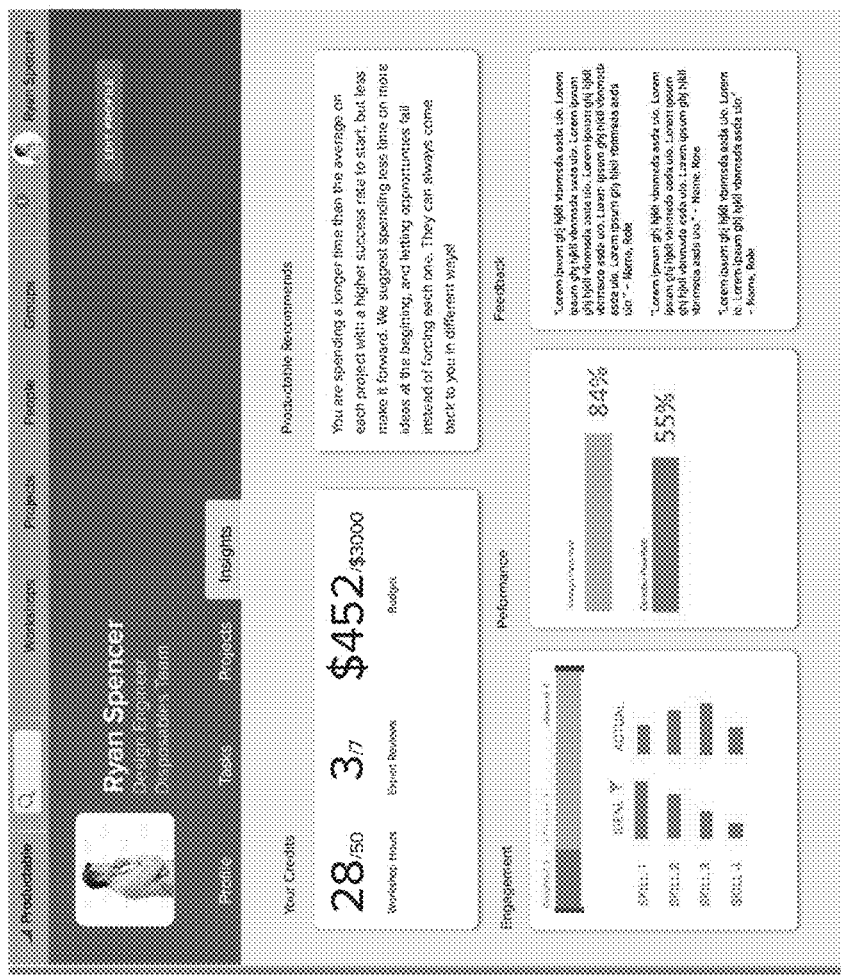
FIG. 6 depicts a user profile dashboard according to an embodiment of the present disclosure.

FIG. 6 depicts a user profile dashboard according to an embodiment of the present disclosure. The user may view or edit his/her profile, view his/her tasks, view his/her projects, and review insights which may include, but are not limited to, credits (workshop hours, expert reviews, budget), recommendations, feedback, performance percentages, and engagement indicators. To complete his/her profile, the user may be prompted with a series of questions that may allow the user to type in answers, select from dropdown menus or multiple-choice options, and/or uploading content.

Figure 7A:
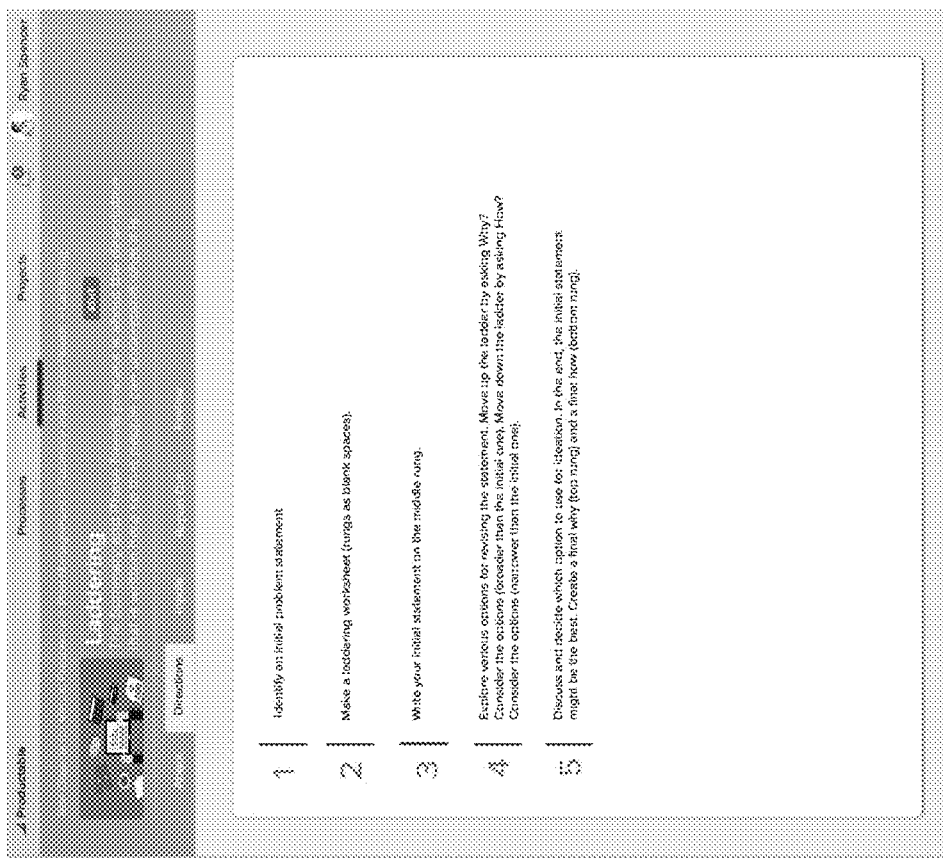
FIGS. 7A-7D depicts screenshots of activity processing according to an embodiment of the present disclosure.
Figure 7B:
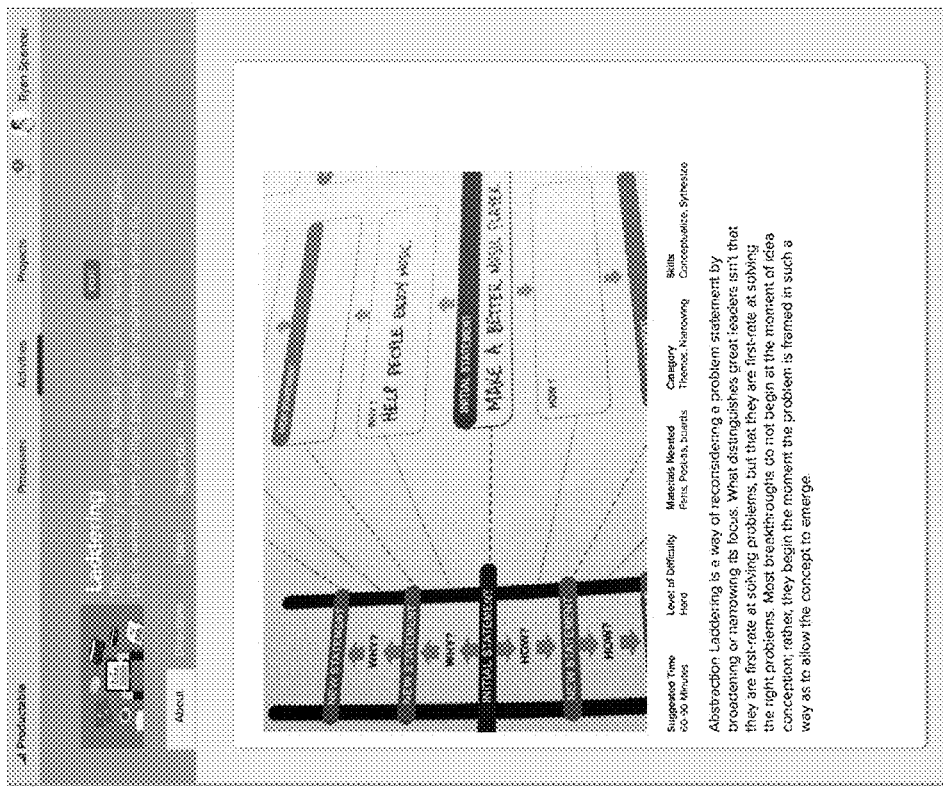
Figure 7D:
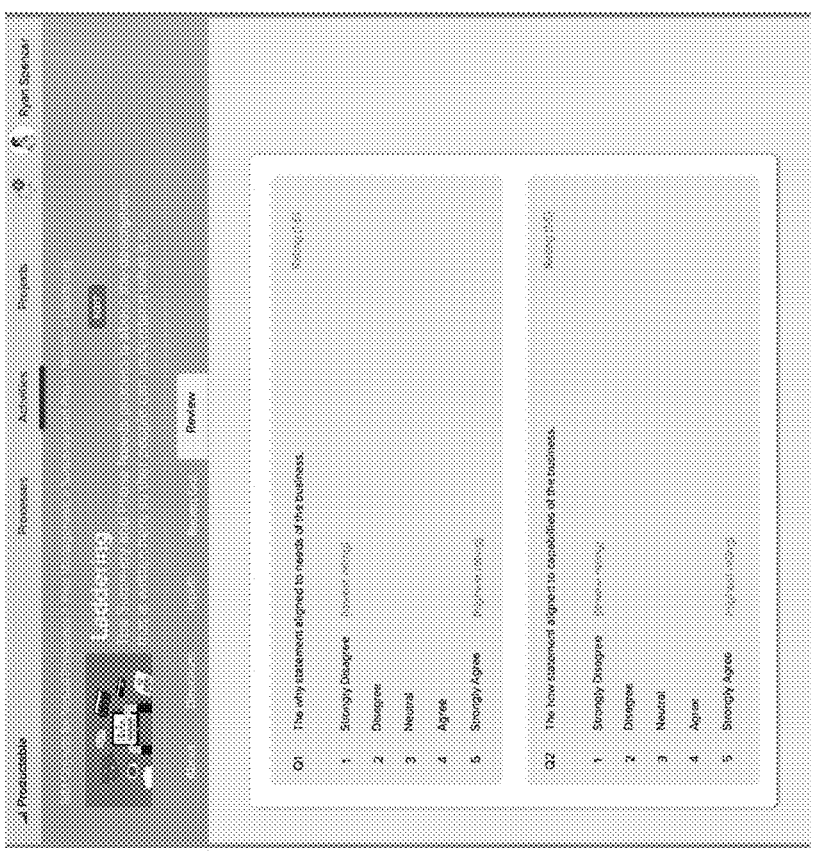
Figure 7C:
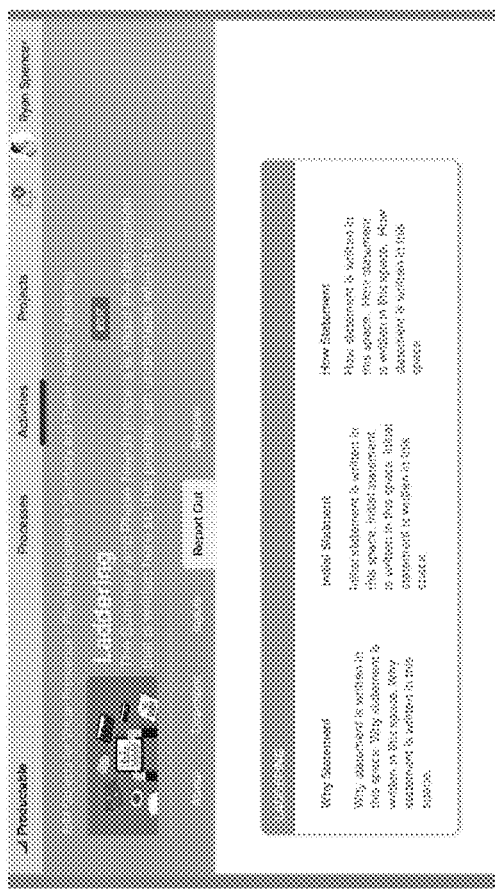
Figure 7E:
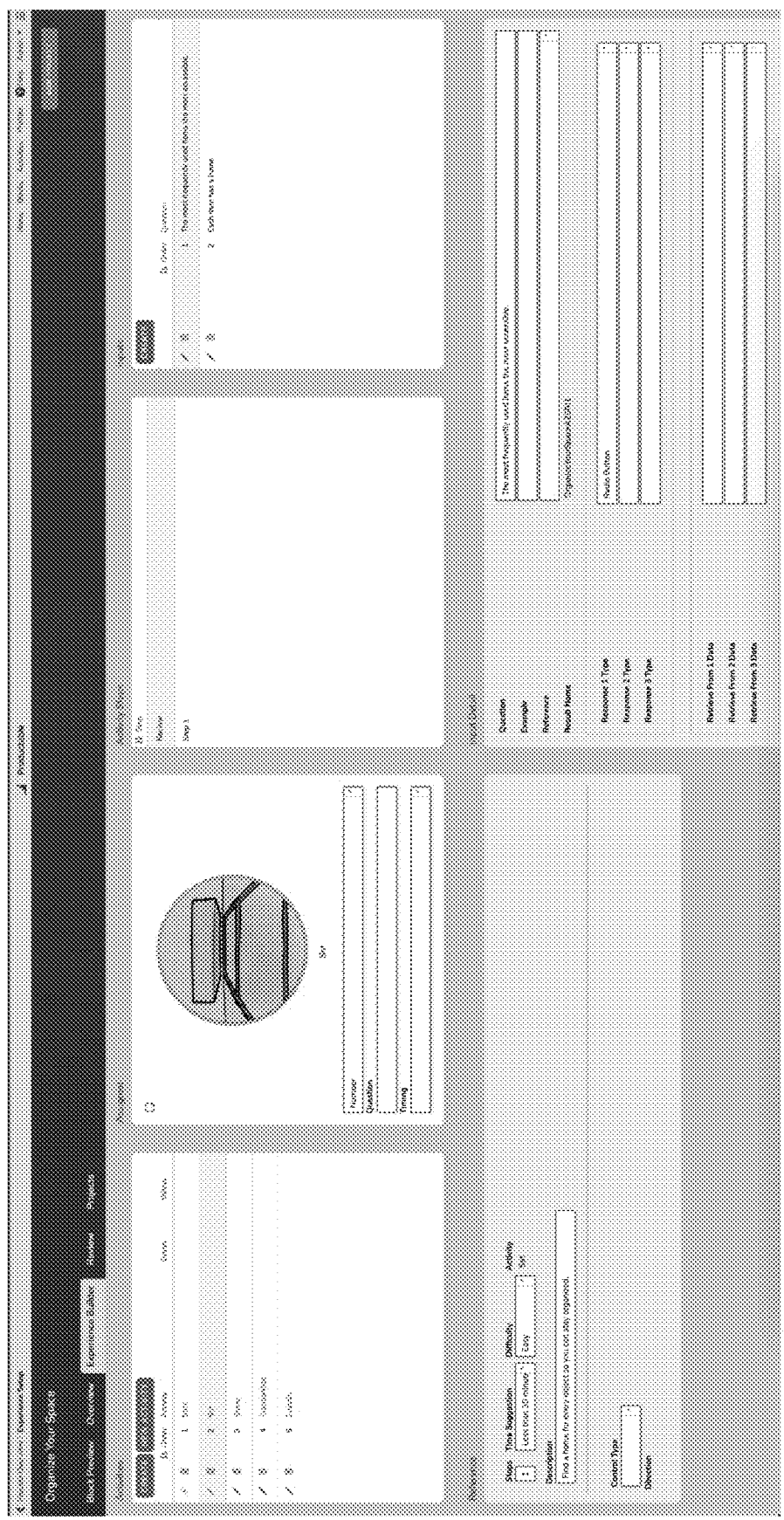
FIG. 7E depicts a block maker according to an embodiment of the present disclosure.

FIGS. 7A-7D depicts screenshots of activity processing according to an embodiment of the present disclosure. It should be appreciated that activities may be part of a block in embodiments of the present disclosure, and FIG. 7E depicts a block maker according to an embodiment of the present disclosure. In this embodiment of the present disclosure, the processing may be done with a laddering activity. FIG. 7A depicts a screenshot of information about the activity including, but not limited to, a summary of the activity, suggested time for completion, level of difficulty, materials needed, category, and/or skills. Directions may then be provided for completing the activity (FIG. 7B). For this activity (laddering), the user may be prompted to identify an initial problem statement, make a laddering worksheet (with rungs as blank spaces), explore various options for revising the statement by moving up the ladder asking "why" and down the ladder by asking "how," and then discuss and decide which option to use for ideation. The directions may differ depending on the activity in embodiments of the present disclosure. The report out (FIG. 7C) may provide a summary of the information processed during the activity. In this embodiment, the why statement, the initial statement, and the how statement may be summarized. The user may then be prompted to answer one or more questions in review to evaluate whether the information identified during the activity is relevant to the needs and/or capabilities of the business (FIG. 7D).

In embodiments of the present disclosure, a user may be able to view each of the processes or blocks to which he/she is assigned. If a user selects a process/block to review further, the user may be presented with a dashboard reflecting the activities associated with the process including information about the level of difficulty and/or the number of programs involved with the activity. The user may be able to review the process/block in embodiments of the present disclosure. The user also may be able to review a dashboard of each of the projects to which he/she has been assigned, and this dashboard may indicate whether review of a project is needed, whether review is complete, and/or the percentage of allocation used in an embodiment of the present disclosure.

By selecting a project, the user may run a block (i.e., experimentation), and as previously described, the user may be provided with directions on how to run the block, including, but not limited to, suggested time, level of difficulty, materials needed, category, skills, and/or additional resources. The user may be prompted to share what he/she wants to test, share what the test affects, share independent variables, and share dependent variables in the embodiment of an experimentation process. However, other inputs may be provided for other blocks in embodiments of the present disclosure. The user also may be prompted to complete one or more review questions in connection with running the block. The user may then view a report of the project details, a summary of the block run, and other summary materials related to blocks associated with the project.

FIG. 7E depicts a block maker according to an embodiment of the present disclosure. As depicted herein, activities may be created and sorted. With respect to an activity, the activity may be assigned, questions may be identified, activity steps may be included, inputs may be created, references (i.e., steps, time suggestion, difficulty, description, control type) may be included, and details for inputs (i.e., questions, examples, references, response types) may be added.

A project review may be conducted after a block has been run in embodiments of the present disclosure. In an embodiment of the present disclosure where an experimentation block is run, a summary of the tests and effects may be provided, and the user may be prompted to answer one or more questions about whether the final concept meets approval (i.e., brings intended value to customers, meets customer needs).

Figure 8A:
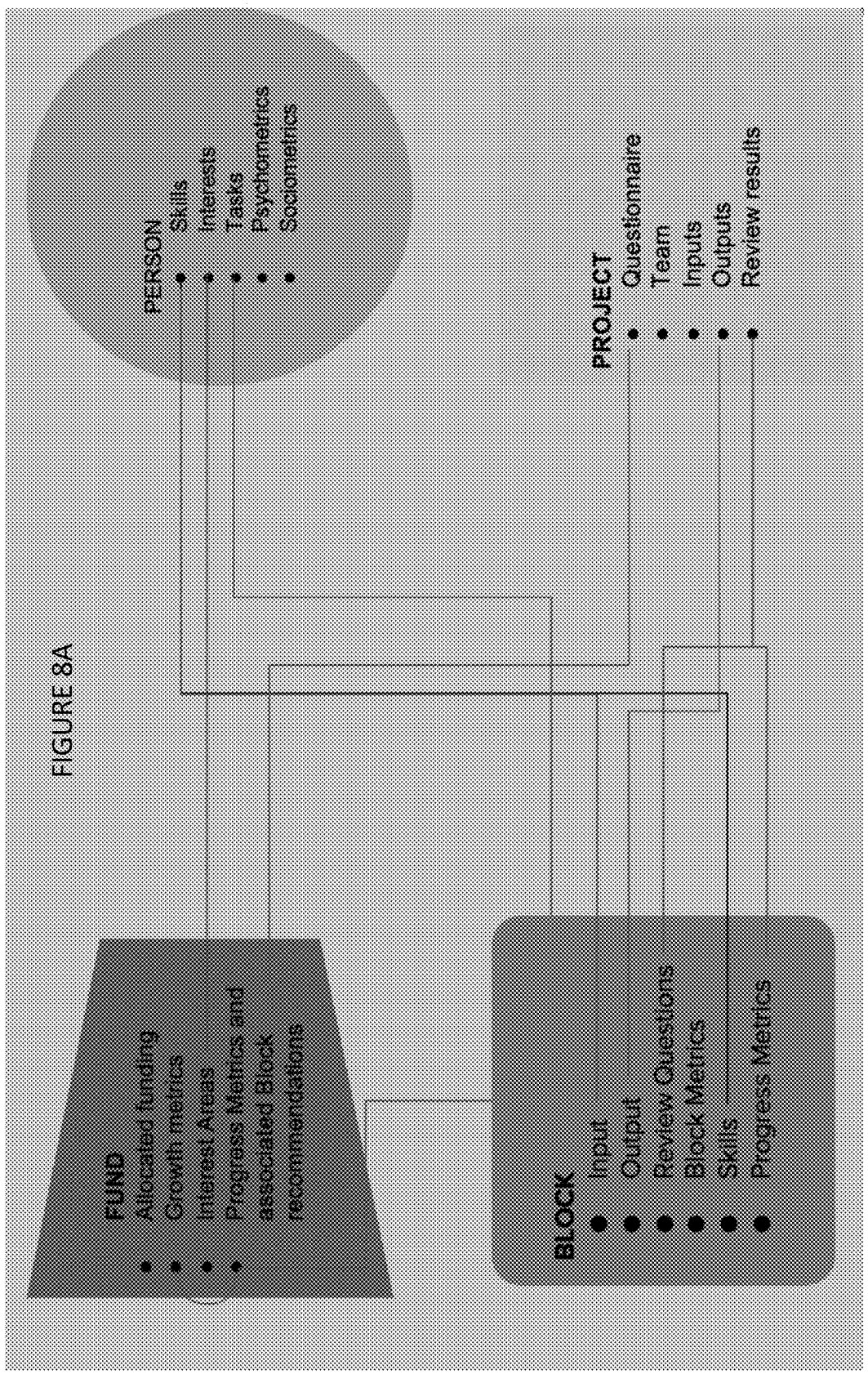
FIGS. 8A and 8B depict information that may be stored in the one or more databases according to an embodiment of the present disclosure.
Figure 8B:
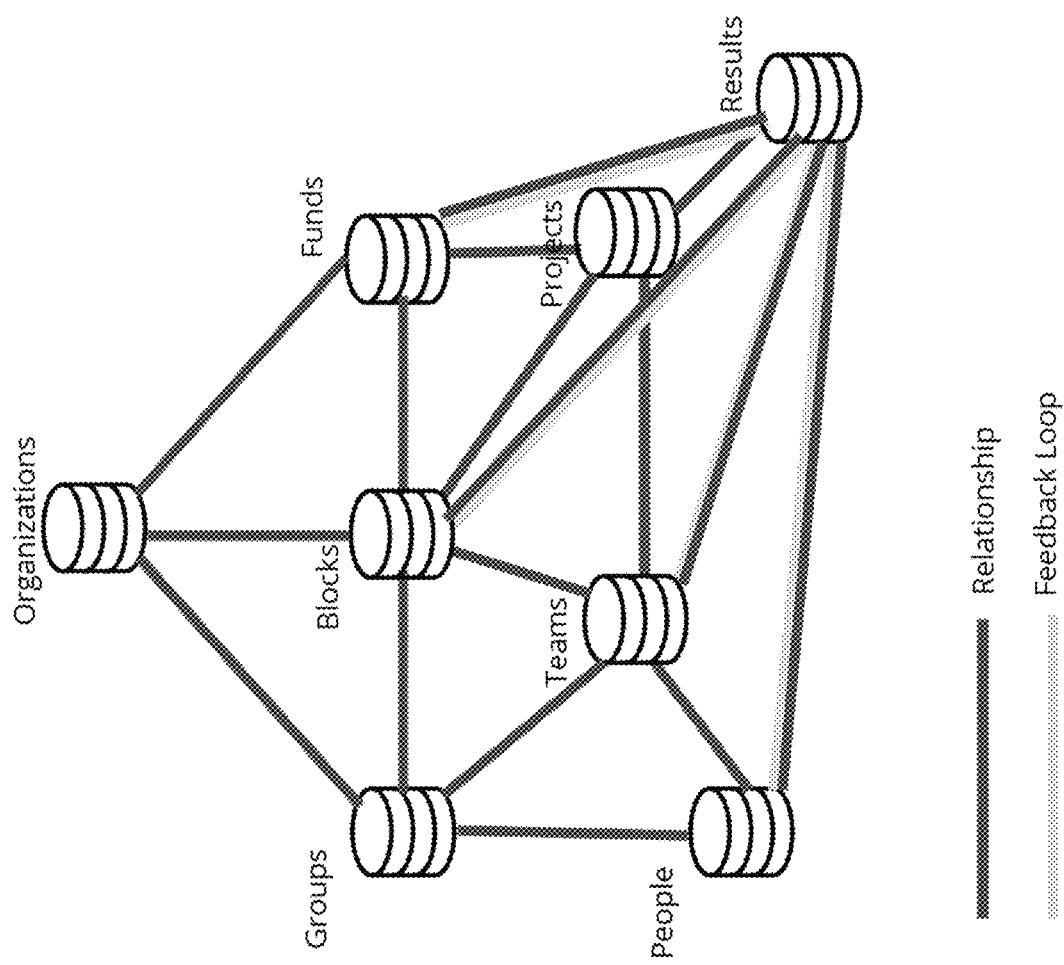

One or more databases may store all people, process, and outcome data and may be used to build recommendations based off what is proven to work and what does not in embodiments of the present disclosure. The user can opt into use of the one or more databases for setting up future opportunity areas or revamping the existing ones. FIGS. 8A and 8B depict information that may be stored in the one or more databases according to an embodiment of the present disclosure.

FIG. 8A depicts four segmentations of information that may be stored in the same or separate databases. Fund information may include, but is not limited to, allocated funding, growth metrics, interest areas, progress metrics and/or associated block recommendations. Block information may include, but is not limited to, inputs, outputs, review questions, block metrics, skills, and/or progress metrics. Person information may include, but is not limited to, skills, interests, tasks, psychometrics, and/or sociometrics. Project information may include, but is not limited to, questionnaire(s), team, inputs, outputs, and review results. FIG. 8A also depicts some of the relationships between information that may be stored in the one or more databases. For example, growth metrics and progress metrics and associated block recommendations may be connected and may be used to inform the block information.

FIG. 8B provides another depiction of information segmentations according to an embodiment of the present disclosure. In addition to the four types of information described with respect to FIG. 8A, segmentations also may include, but are not limited to, groups, teams, organizations, and/or results. FIG. 8B also depicts the relationships between and among the information segmentations as well as how there may be a feedback loop with respect to some of the information segmentations in embodiments of the present disclosure.

It should be appreciated that blocks may be used to improve the maturity of people, pipelines, and portfolios in embodiments of the present disclosure. Blocks can be created by outside groups and recommended into a team or persons. People can be certified to run the Hocks. Blocks also can be run by outside people for projects. Through a portfolio, goals and resources may be forecast, and blocks of work can be run to progress portfolio model maturity. Through a pipeline, decisions and/or supporting blocks may be forecast and blocks of work can be run to progress pipeline model maturity. It also should be appreciated that from a group standpoint, the best teams may be forecast. For a project, blocks of work may be recommended, and persons may be recommended to complete the blocks. Accordingly, blocks of work may progress personal innovation mindset and/or progress the project. Progress, pipeline, and/or portfolio progress/challenge updates may be made. It also should be appreciated that accounting can occur automatically, asynchronously, and/or to a different cadence than blocks in embodiments of the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for predictive analytics comprising:

identifying one or more opportunity area goals and resources associated with a portfolio, wherein the portfolio is a large set of projects that represent bets made against a larger goal and the portfolio further represents a potential solution to a larger problem;

recommending and assigning, via an interactive dashboard, one or more blocks of work presented to a user with the interactive dashboard to select from one or more selectable options the one or more blocks of work to review for each project optimized to lead to success of the portfolio, wherein the one or more selectable options include the user selection of one or more selectable options displayed on the dashboard;

prompting, via the interactive dashboard, the user to respond with a series of questions that allows the user to provide information or select from the one or more selectable options, wherein the series of questions includes the one or more selectable options for the user to provide an answer to one or more questions to evaluate whether the information identified during an activity is relevant to needs and capabilities of a business;

associating progress metrics with each of the one or more blocks of work based on feedback loops and/or performance reviews, wherein the progress metrics comprise person, project, pipeline, and portfolio data;

allocating funding, growth metrics, interest areas, progress metrics and/or associated block recommendations;

running the one or more blocks of work to progress model maturity of the portfolio;

upon completion of the one or more blocks of work, evaluating performance of the one or more blocks of work;

reconciling the performance of the one or more blocks of work with the one or more opportunity area goals and resources associated with the portfolio, wherein the reconciling the performance of the one or more blocks include forecasting and improving relative to the one or more opportunity area goals and resources;

updating the forecasting of the one or more opportunity areas goals and resources based on the progress of the portfolio;

re-running the one or more blocks of work, wherein any project management approach is capable of being utilized to apply the recommended one or more blocks of work to each project; and storing, by one or more databases, all people, process, and outcome data associated with the portfolio which is then used to build further recommendations of one or more blocks of work based on what is proven to work and what is not.

2. The method of claim 1, the blocks of work selected from the group comprising:

return on investment (ROI) calculation, user interviews, prototype creation, user testing, market sizing, extreme ideation, experiment design, pricing strategy, persona creation, communication and/or prioritization.

3. The method of claim 1, the progress metrics selected from the group comprising:

required skills, types of progress it drives, speed of deployment, productivity rate, maintenance error rate, psychometrics, sociometrics, phases of innovation, and type of effort.

4. The method of claim 1, wherein each of the one or more blocks further comprise:

expert review questions that check the quality of work completed, funder review questions that check the progress of the idea, and/or individual review that is a hybrid of the expert review questions and the funder review questions.

5. The method of claim 1, wherein the recommending and assigning step uses a questionnaire that understands current progress of a user to recommend one or more blocks of work.

6. The method of claim 1, wherein evaluating performance comprises at least one of the following:

comparing expected to actual outcomes, evaluating pipeline success rate, evaluating portfolio trends, reviewing progress, reviewing progress effectiveness, and reviewing block effectiveness and feedback.

7. The method of claim 1, wherein each of the one or more blocks of work includes at least one activity that is assigned to one or more team members for completion.

8. The method of claim 1, wherein resources are time and/or monetary.

* * * * *